(12) United States Patent
Haess et al.

(10) Patent No.: US 7,188,233 B2
(45) Date of Patent: Mar. 6, 2007

(54) SYSTEM AND METHOD FOR PERFORMING FLOATING POINT STORE FOLDING

(75) Inventors: Juergen Haess, Schoenaich (DE); Michael Kroener, Ehningen (DE); Dung Quoc Nguyen, Austin, TX (US); Lawrence J. Powell, Jr., Round Rock, TX (US); Eric M. Schwarz, Gardiner, NY (US); Son Dao-Trong, Stuttgart (DE); Raymond C. Yeung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 11/054,686

(22) Filed: Feb. 9, 2005

(65) Prior Publication Data

US 2006/0179100 A1   Aug. 10, 2006

(51) Int. Cl.
*G06F 9/312* (2006.01)
(52) U.S. Cl. ..................... 712/222; 712/225
(58) Field of Classification Search ............... 712/222, 712/225; 708/495
See application file for complete search history.

(56) References Cited

U.S. PATENT DOCUMENTS

| 5,615,350 | A |   | 3/1997 | Hesson et al. |
| 5,878,242 | A | * | 3/1999 | Olson et al. ................. 712/216 |
| 5,974,538 | A |   | 10/1999 | Wilmot, II |
| 6,049,860 | A |   | 4/2000 | Krygowski et al. |
| 6,289,437 | B1 |   | 9/2001 | Eisen et al. |
| 6,408,379 | B1 |   | 6/2002 | Juffa et al. |

\* cited by examiner

*Primary Examiner*—William M. Treat
(74) *Attorney, Agent, or Firm*—Cantor Colburn LLP

(57) ABSTRACT

A system for performing floating point arithmetic operations including a plurality of stages making up a pipeline, the stages including a first stage and a last stage. The system also includes a register file adapted for receiving a store instruction for input to the pipeline, where the data associated with the store instruction is dependent on a previous operation still in the pipeline. The system further includes a store register adapted for outputting the data associated with the store instruction to memory and a control unit having instructions. The instructions are directed to inputting the store instruction into the pipeline and to providing a path for forwarding the data associated with the store instruction from the last stage in the pipeline to the store register for use by the store instruction if the previous operation immediately precedes the store operation in the pipeline and if there is a data type match between the store instruction and the previous operation. In addition, the instructions are directed to inputting the store instruction into the pipeline and to providing a path for forwarding the data associated with the store instruction from the first stage in the pipeline to the store register for use by the store instruction if the previous operation precedes the store operation by one or more stage in the pipeline and if there is a data type match between the store instruction and the previous operation.

16 Claims, 6 Drawing Sheets

SYSTEM AND METHOD FOR PERFORMING FLOATING POINT STORE FOLDING

IBM® is a registered trademark of International Business Machines Corporation, Armonk, N.Y., U.S.A. S/390, Z900 and z990 and other names used herein may be registered trademarks, trademarks or product names of International Business Machines Corporation or other companies.

BACKGROUND OF THE INVENTION

This invention relates to computer systems that execute floating point instructions, and more particularly, to a method and system for processing mixed precision floating point store instructions in a floating point pipeline to increase performance and robustness of data dependency resolution.

Most modern micro-processors implement floating point instructions in hardware. Since a floating point instruction often requires multiple cycles of execution, a pipeline structure is implemented to allow over-lapped execution of these instructions. The pipeline implementation allows instructions to be accepted every cycle and to produce a result every cycle. Any blockages in the pipeline create stalls which in turn decrease the throughput of the pipeline and lower the performance of the micro-processor.

During the floating point computation it is often necessary to store away intermediate results. This is done through the use of a floating point store instruction which stores a specified floating point register to a specified storage address. In a micro-architecture which has in-order single or multiple instruction issue and completion, it is desirable to execute the store instruction in the pipeline along with the other floating point instructions to simplify control and to minimize area.

Pipelining floating point store instructions presents a problem. A floating point store instruction may only require one cycle of execution. Executing floating point stores in the same pipeline with other floating point arithmetic instructions increases the latency of the store. The throughput of a pipeline is threatened by the occurrence of stall cycles. Therefore, it is desirable to minimize the occurrence of stall cycles. One source of stall cycles is when an instruction is data dependent on a previous instruction in the pipeline. Traditionally, the instruction is stalled at the top of the pipeline until the data can be effectively wrapped from the bottom of the pipeline into the input register. However, stalling the instruction at the top of the pipeline blocks other instructions from entering the pipeline.

Floating point store instructions have typically been executed in dedicated load/store execution units. There are many disadvantages associated with using a separate load/store unit. There is an additional area cost of the additional unit. The control sequencing of dispatching and completing from the addition unit is more complex. Additional read ports to the floating point register array are required, thereby increasing its size. In order to eliminate stall cycles using a separate load/store unit, data forwarding paths are required that forward between the floating point execution unit to the load/store unit. These paths may be long and potentially limit the cycle time of the processor. In addition, the forwarding paths potentially contribute to a less than optimal wiring solution for the chip.

A floating point unit typically consists of several pipeline stages, such as multiple pipeline stages for arithmetic computation (e.g., addition and multiplication), a normalization stage, and a rounding stage. Each pipeline stage may contain a separate instruction and the stages are connected in an ordered manner. As an instruction enters the pipeline, the necessary input data operands are accessed and put into the first stage of the pipeline. The instruction advances from stage to stage within the pipeline as permitted. An instruction is considered to "stall" within the pipeline when forward progress is not allowed. An instruction is not permitted to advance to a new stage in the pipeline when the successive pipeline stage contains another previous instruction that itself cannot advance. An instruction cannot commence to operate until it has data to operate on. It may not have data to operate upon when an earlier instruction will update the data that a successive instruction will operate upon. This is referred to as a data dependency. For this reason, the successive instruction will "stall" at the entrance to the pipeline until it receives the updated data.

It would be desirable to be able to allow a store to issue into a pipeline before the data associated with the store is available. This would result in a smaller elapsed time between, for example, an arithmetic instruction and a subsequent store instruction that is dependent on data from the arithmetic instruction. This has been performed for architectures that treat the register file as bits of memory without any format conversion (e.g., IBM zSeries). This method applies when there is not a data type mismatch in the pipeline. See, for example, U.S. Pat. No. 6,049,860 to Krygowski et al., of common assignment herewith. It would be desirable to extend the concept of "store folding" as disclosed in the referenced patent to architectures where the register file is treated as a given format (e.g., IBM PowerPC).

BRIEF SUMMARY OF THE INVENTION

Exemplary embodiments of the present invention include a system for performing floating point arithmetic operations. The system includes a plurality of stages making up a pipeline, the stages including a first stage and a last stage. The system also includes a register file adapted for receiving a store instruction for input to the pipeline, where the data associated with the store instruction is dependent on a previous operation still in the pipeline. The system further includes a store register adapted for outputting the data associated with the store instruction to memory and a control unit having instructions. The instructions are directed to inputting the store instruction into the pipeline and to providing a path for forwarding the data associated with the store instruction from the last stage in the pipeline to the store register for use by the store instruction if the previous operation immediately precedes the store operation in the pipeline and if there is a data type match between the store instruction and the previous operation. In addition, the instructions are directed to inputting the store instruction into the pipeline and to providing a path for forwarding the data associated with the store instruction from the first stage in the pipeline to the store register for use by the store instruction if the previous operation precedes the store operation by one or more stages in the pipeline and if there is a data type match between the store instruction and the previous operation.

Additional exemplary embodiments include a method for performing floating point arithmetic operations. The method includes receiving a store instruction for input to a pipeline made of a plurality of stages including a first stage and a last stage. Data associated with the store instruction is dependent on a previous operation still in the pipeline. The store instruction is input to the pipeline and a path is provided for forwarding the data associated with the store instruction from the last stage in the pipeline to a store register for use by the store instruction if the previous operation immediately precedes the store operation in the pipeline and if there is a data type match between the store instruction and the previous operation. The store register is adapted for outputting the data associated with the store instruction to memory. The store instruction is input to the pipeline and a path is provided for forwarding the data associated with the store instruction from the first stage in the pipeline to the store register for use by the store instruction if the previous operation precedes the store operation by one or more stages in the pipeline and if there is a data type match between the store instruction and the previous operation.

Also described is a mechanism for determining if there is a data type mismatch and if there is a plurality of stages between 1 and 8 where data cannot be bypassed and the store instruction must be stalled.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
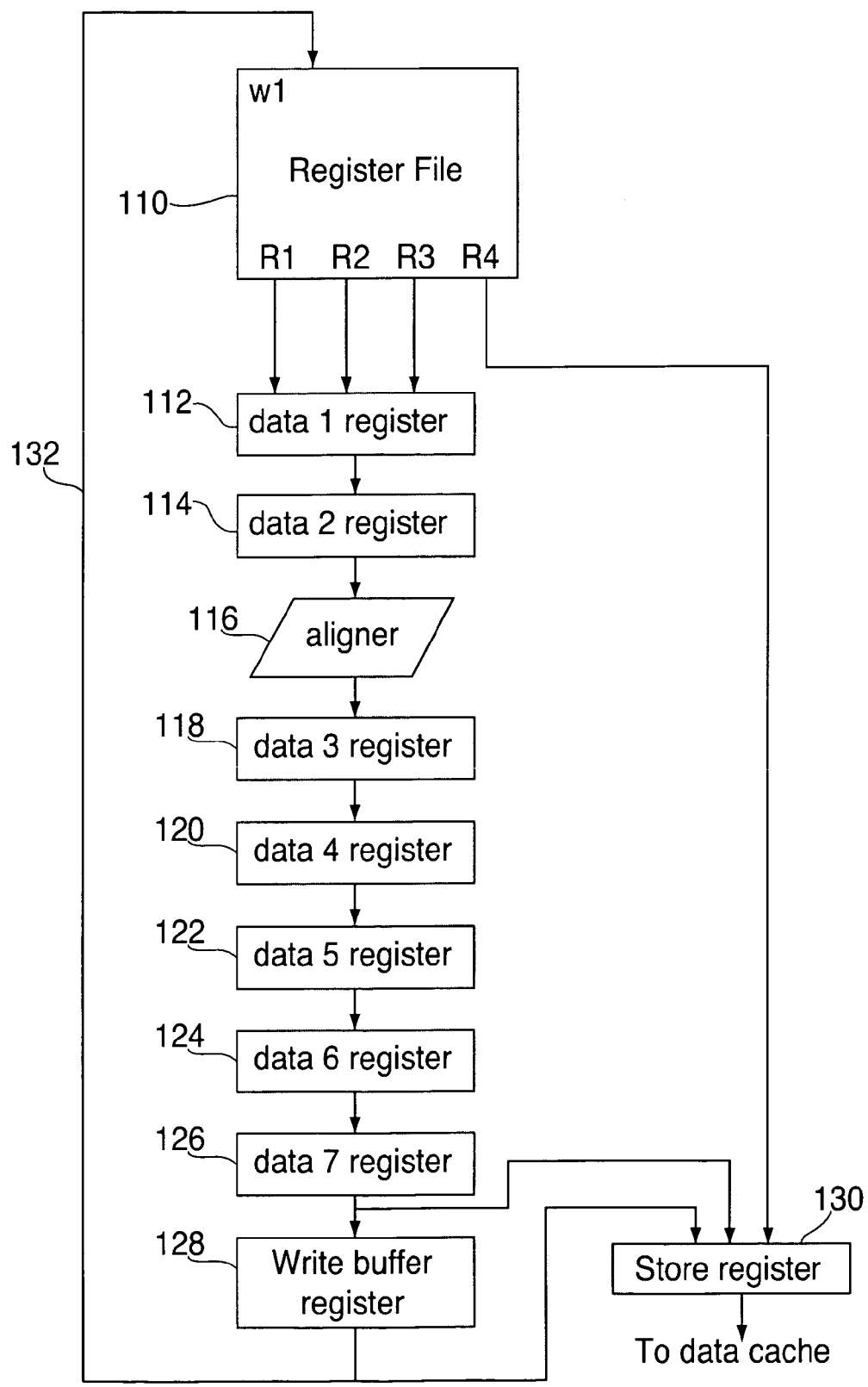
FIG. 1 depicts a dataflow pipeline of a floating point unit (FPU) that may be utilized by exemplary embodiments of the present invention.

The detailed description explains the preferred embodiments of the invention, together with advantages and features, by way of example with reference to the drawings.

DETAILED DESCRIPTION OF THE PREFERRED EMBODIMENTS

In architectures which define the floating point register (FPR) to contain one data format (e.g., IBM Power PC) and in implementations which skip format conversion on loads or arithmetic operations for single precision results, it is typical that tags are utilized to identify non-compliant entries. Implementations typically attempt to make loads very fast and do not want to perform conversion on the rare case of a denormal input operand, so they create tags to identify non-compliant entries. It is also difficult to produce an arithmetic result which is rounded to a single precision denormal format and then to normalize the result to double precision in the register file. So for these cases, many implementations tag the entry to make sure it is known that it is not compliant with the architecturally defined register file. Floating point stores can be double precision or single precision. Double precision stores have problems with denormal single precision data since it is represented as a normalized number in double precision. Single precision stores can have problems with double precision data which falls in the range of single precision denormal data since this data must be denormalized. In several cases shifting is required, but these cases do not occur frequently. Exemplary embodiments of the present invention detect the mismatch cases and delay them while allowing other bypass cases to complete without delay regardless of the number of cycles separating the store and the prior dependent operation.

In an exemplary embodiment of the present invention, a mechanism is created in the store data queue (SDQ) which detects whether a double precision instruction is in the pipeline and whether a single precision instruction is in the pipeline. This information is consulted when a floating point store is to be issued. If the opposite data type result from an arithmetic instruction in the pipeline when a store is consulted, then it is not issued until the arithmetic instruction clears the stages of the pipeline. In an exemplary embodiment of the present invention, the actual dependency is not checked between the store and the arithmetic instruction. However, this could be an alternate implementation. This exemplary embodiment is simpler but not as high performance as the alternate where the actual dependency is checked. Once the store is issued to the floating point unit (FPU), data is read from the FPRs, passed through the seven pipeline stages, and potentially shifted to adjust for mismatched data types.

During execution it is also detected whether there is a late bypass necessary from a prior executing instruction with a matching data type. In exemplary embodiments of the present invention, there are two possible bypasses. If the instructions are directly next to each other, the data is bypassed directly from the last stage of the pipeline back to itself. Alternatively, if the store and arithmetic instruction are separated by more than one cycle, the data is read from the FPR from an extra read port into the last stage of the pipeline. In this manner, the bypass from within the pipeline or the late read of the FPR may provide data from dependent instructions of the same data type, while the early read may provide full functionality to perform data conversions for all other cases. This provides full functionality and high performance for frequent cases.

FIG. 1 depicts a dataflow pipeline of a floating point unit (FPU) that may be utilized by exemplary embodiments of the present invention. Instructions are received (e.g., from a control unit) into a register file 110. In exemplary embodiments of the present invention, the register file 110 includes both a floating point register array and a data input register. Instruction data is received into the register file 110 and data is output to memory from a store register 130. In exemplary embodiments of the present invention, there are three paths that data for a floating point store instruction may take. The first case is when the store is not data dependent on a previous instruction in the pipeline and/or the output of the previous instruction (that produces the store data) in the pipeline is of a different data type than the store instruction (i.e. a data type mismatch occurs). In this first case, the data for the store instruction follows the typical path through the pipeline. The second case is when the store is data dependent on another instruction in the pipeline but there exists one or more instructions between the store instruction and the interlocking instruction. In addition, the second case requires that the output of the previous instruction in the pipeline has the same data type as the store instruction (i.e. a data type match). In this second case, the data for the store instruction (the output of the previous instruction) moves from the register file 110 directly to the store register 130. The third case is when the store instruction is interlocked with another instruction in the pipeline and there are no instructions between the two. In addition, the third case requires that the output of the immediately previous instruction in the pipeline has the same data type as the store instruction. In this third case, the data for the store instruction (the output of the immediately previous instruction in the pipeline) moves from the last register file in the pipeline (e.g., 126 in FIG. 1) into the store register 130.

The first case, as described above, occurs when the store is not data dependent on a previous instruction in the pipeline and/or the output of the previous instruction (that produces the store data) in the pipeline is of a different data type than the store instruction. As the store instruction enters the pipeline, the contents of the source of the store instruction is read out of a floating point register array and input into the register file 110. The data corresponding to the store instruction, available at the start of the store instruction from the register file 110 moves from data one register 112 to data two register 114 to an aligner 116 to data three register 118 and so on until a data seven register 126 at the end of the pipeline. The store instruction is then fed to the store register 130 of the pipeline once it becomes available. Once the store instruction is in the write store register 130 of the pipeline, it is transferred to a memory or storage unit (e.g., data cache in FIG. 1).

The second case, as described above, occurs when the store is data dependent on another instruction in the pipeline but there exists one or more instructions between the store instruction and the interlocking instruction. In addition, the second case requires that the output of the previous instruction in the pipeline have the same data type as the store instruction. If the data types of the output of the interlocked instruction and the store instruction are different, the first case as described above must be executed so that the alignment necessary to handle the mixed data types is performed.

In the second case, as the store instruction enters the pipeline, the contents of the source of the store is read out of the floating point register array and placed into the data input register within the register file 110 even though the data is not the correct data in this case. A control unit associated with the pipeline may detect that there is an interlock with another instruction already in the pipeline and that the data types match. The interlocked is described as one which is of the delayed type. Once in the pipeline, the control unit monitors the state of interlock every cycle. The store instruction continues down the pipeline while the interlocking instruction reaches the write buffer register 128 of the pipeline where the result data is written into the register file 110 through an external feedback path 132. After this occurs and when the store instruction is active in the last stage of the pipeline, the data is read from register file 110 to the store register 130. Once the correct store instruction data is in the store register 130 of the pipeline, it is transferred to the storage unit.

The third case, as described above, occurs when the store instruction is interlocked with another instruction in the pipeline and there are no instructions between the two. In addition, the third case requires that the output of the immediately previous instruction in the pipeline have the same data type as the store instruction. As the store instruction enters the pipeline, the contents of the source of the store is read out of the floating point register file and placed into the data input register even though it is not valid in this case. In the exemplary embodiment depicted in FIG. 1, both the floating point register file and the data input register are within the register file 110. The control unit associated with the pipeline detects that there is an interlock with another instruction already in the pipeline. The interlock is described as one which is of the immediate type. The store is moved forward in the pipeline from the data one register 112 to the data two register 114 and so on through the data seven register 126. Note that the store instruction is moved forward in the pipeline even though its data is not valid yet. When the interlocking instruction is in the write buffer 128, its data is transmitted to the store register 130 of the pipeline along with being moved forward to the register file 110. Then, the store transfers the correct data in the store register 130 to the storage unit.

Figure 2:
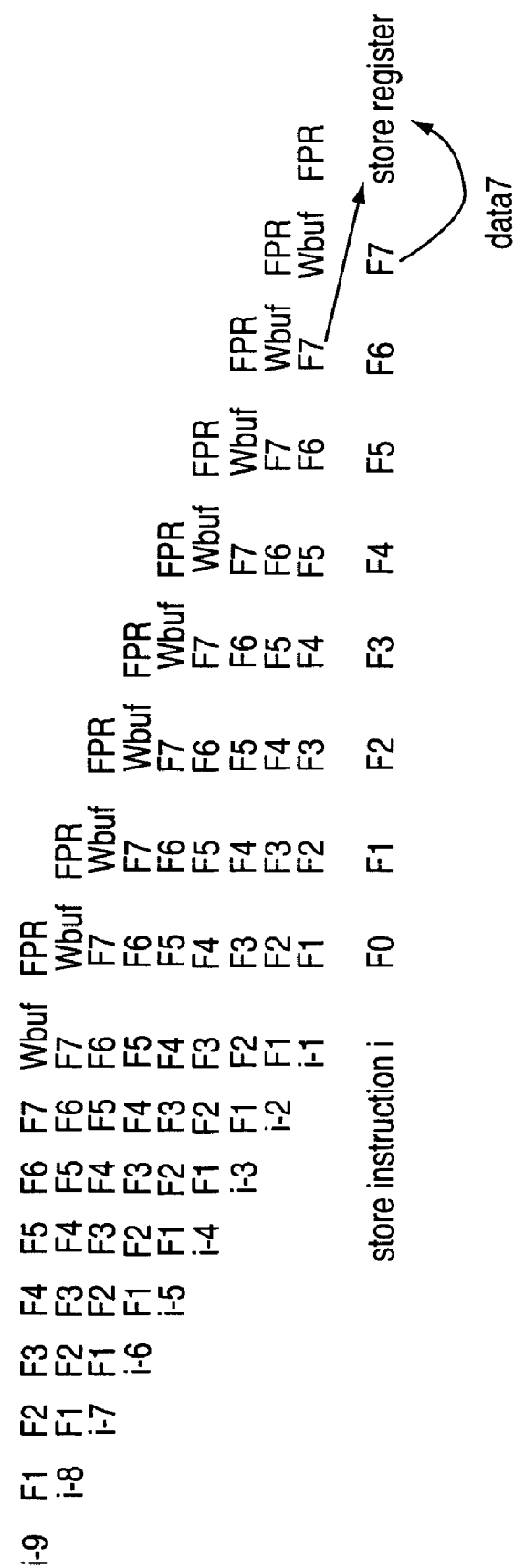
FIG. 2 depicts an exemplary timing diagram of instructions prior to store instructions that may be utilized by exemplary embodiments of the present invention.

FIG. 2 depicts an exemplary timing diagram of prior instructions to store instructions that may be utilized by exemplary embodiments of the present invention. It depicts a seven-cycle pipeline (F1, F2, F3, F4, F5, F6, and F7) followed by the write buffer register 128 going into the floating point register (FPR) and the FPR. The store instruction is labeled as "i" and other instructions are labeled according to how many cycles they occur before the store instruction. For example, "i–1" designates an instruction that was started in the pipeline one cycle before the store instruction and "i=4" designates an instruction that was started in the pipeline four cycles before the store instruction.

The first case, described above, occurs when the instruction with data outputs being stored by the store instruction are started in the pipeline "i–9" or more cycles before the store instruction, "i." In this case, the data follows the normal path (e.g., from the register file 110 to the data one register 112 to the data two register 114 to the aligner 116 and so on to the data seven register 126, and then to the store register 130 and the register file 110) and is converted by the aligner 116 if there is a data type mismatch. This first case also occurs when there is no dependency between the store instruction and a previous instruction.

The second case, the delayed type, as described above, occurs when the instruction with data outputs being stored by the store instruction are started in the pipeline "i–8" to "i–2" cycles before the store instruction, "i." In this case, the data from the prior instruction is read from read port four (R4) in the register file 110 into the store register 130. In this manner the data can catch up with the store instruction. There cannot be a data type mismatch in this second case.

The third case, the immediate type, as described above, occurs when the instruction with data outputs being stored by the store instruction are started in the pipeline "i–1" cycles before the store instruction, "i." In this case, the data from the previous instruction bypasses data from the write buffer register 128 and is inserted into the store register 130 for use by the immediately following store instruction. In case the data is required by other instructions, it also follows the typical path through the write buffer register 128 and back into the register file 110.

Figure 3A:
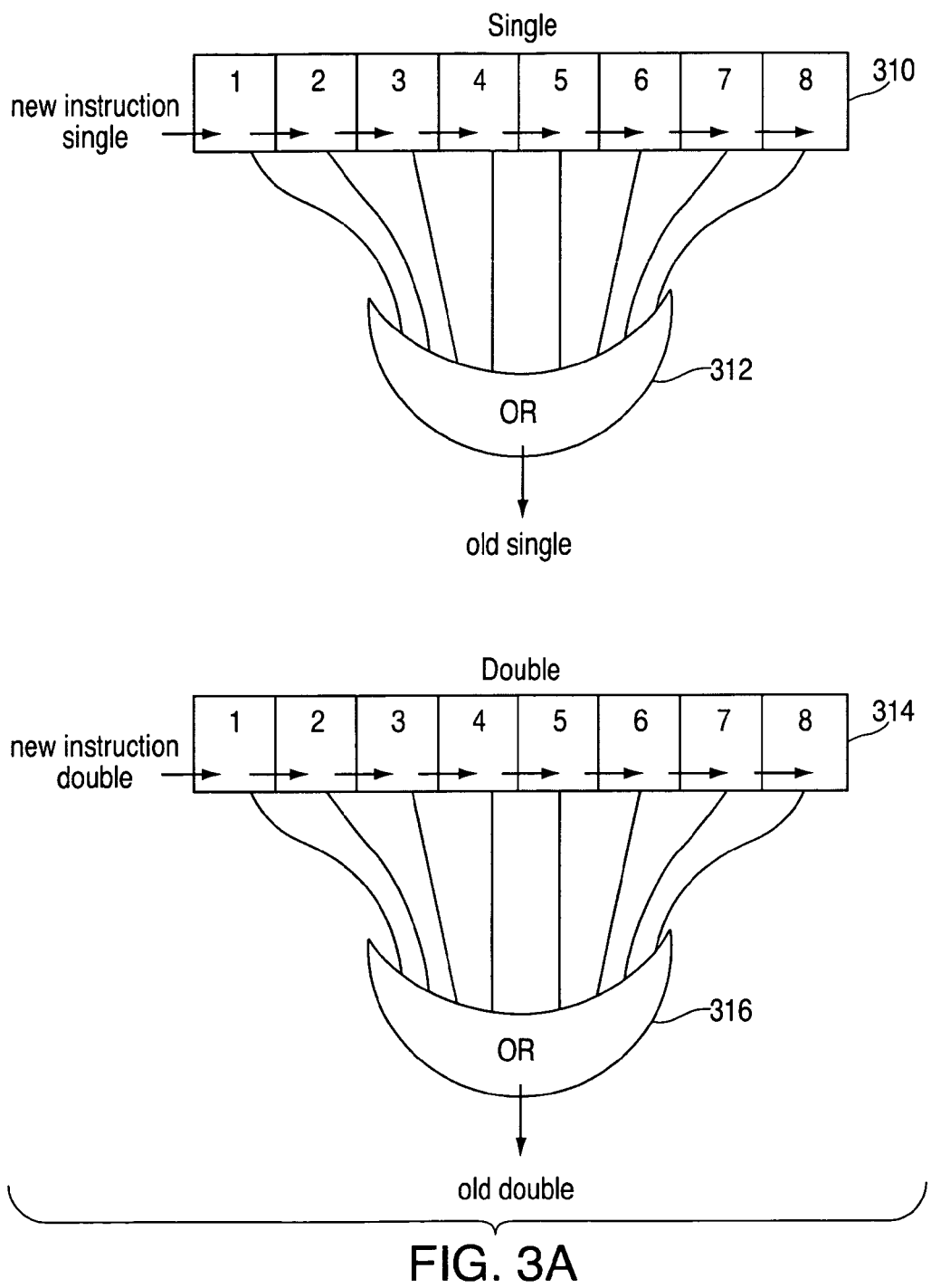
FIG. 3A depicts a simple dispatch unit and FIG. 3B a process flow diagram associated with the simple dispatch unit that may be implemented by exemplary embodiments of the present invention.
Figure 3B:
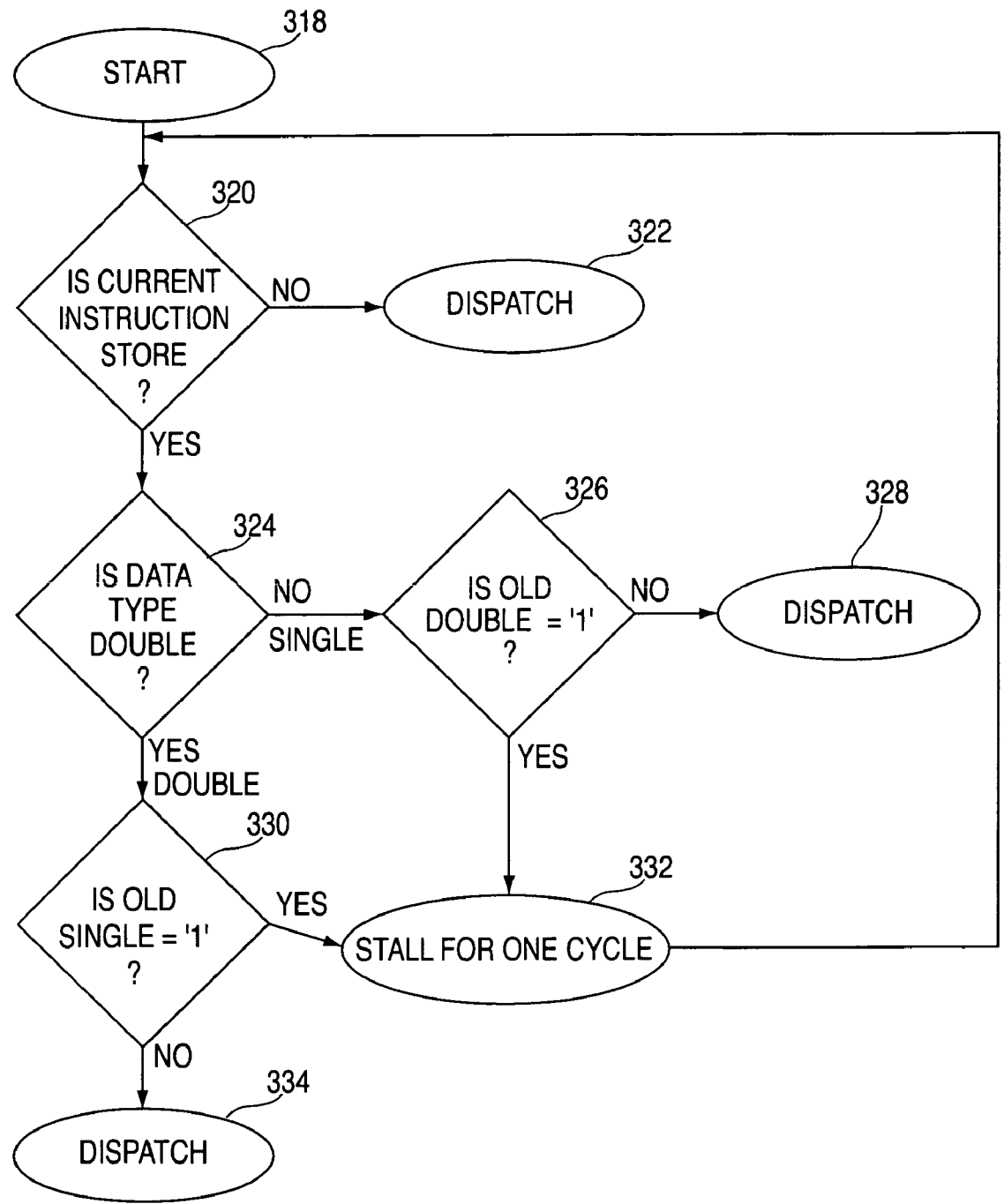

FIG. 3A depicts a simple dispatch unit and FIG. 3B a process flow diagram associated with the simple dispatch unit that may be implemented by exemplary embodiments of the present invention. In an exemplary embodiment of the present invention, the dispatch unit and the instructions to implement the process flow are located in a controller associated with the FPU. The single instruction switch data 310 includes one bit for specifying whether the output from an instruction was in single precision format. If the output from the instruction was in single precision format, then the bit is set to one, otherwise the bit is reset to zero. The single instruction switch data 310 stores information about the last eight instructions. Each time a new instruction is issued, the type associated with the new instruction is stored and the existing values move down one bit in a manner similar to a push down stack, with the oldest value dropping out of the single instruction switch data 310. The value in the single instruction switch data 310 are input to an "or" circuit 312 to determine if any of the previous eight instructions output a single precision number.

Similarly, the double instruction switch data 314 includes one bit for specifying whether the output from an instruction was in double precision format. If the output from the instruction was in double precision format, then the bit is set to one, otherwise the bit is reset to zero. The double instruction switch data 314 stores information about the last eight instructions. Each time a new instruction is issued, the type associated with the new instruction is stored and the existing values move down one bit in a manner similar to a push down stack, with the oldest value dropping out of the double instruction switch data 314. The value in the double instruction switch data 314 are input to an "or" circuit 316 to determine if any of the previous eight instructions output a double precision number.

The process flow depicted in FIG. 3B starts at step 318 and then determines if the current instruction is a store instruction at step 320. If the current instruction is not a store instruction, then the instruction is dispatched at step 322. If the current instruction is a store, as determined at step 320, then step 324 is executed to determine if the data type of the store instruction is double precision. If the precision is not double (i.e. it is single), then step 326 is performed to determine if there are any double precision instructions in the pipeline. If the value of the output from "or" circuit 316 is a one, then there are double precision instructions in the pipeline. If it is determined that there are no double precision instructions in the pipeline (i.e. entire pipeline has single precision instructions), then the instruction is dispatched at step 328. If it is determined that there are double precision instructions in the pipeline, then the instruction is stalled for one cycle at step 332. Processing then continues at step 320 to determine if there is a store instruction and there is not a mix of data types in the pipeline. In exemplary embodiments of the present invention, stalling may be implemented by not entering the store instruction into the pipeline or by not allowing the store instruction to progress to the next stage in the pipeline.

Alternatively, if the data type is double, as determined at step 324, then step 330 is performed to determine if there are any single precision instructions in the pipeline. If the value of the output from "or" circuit 312 is a one, then there are single precision instructions in the pipeline. If it is determined that there are no single precision instructions in the pipeline (i.e., entire pipeline has double precision instructions), then the instruction is dispatched at step 334. If it is determined that there are single precision instructions in the pipeline, then the instruction is stalled for one cycle at step 332. Processing then continues at step 320 to determine if there is a store instruction and there is not a mix of data types in the pipeline.

Figure 4A:
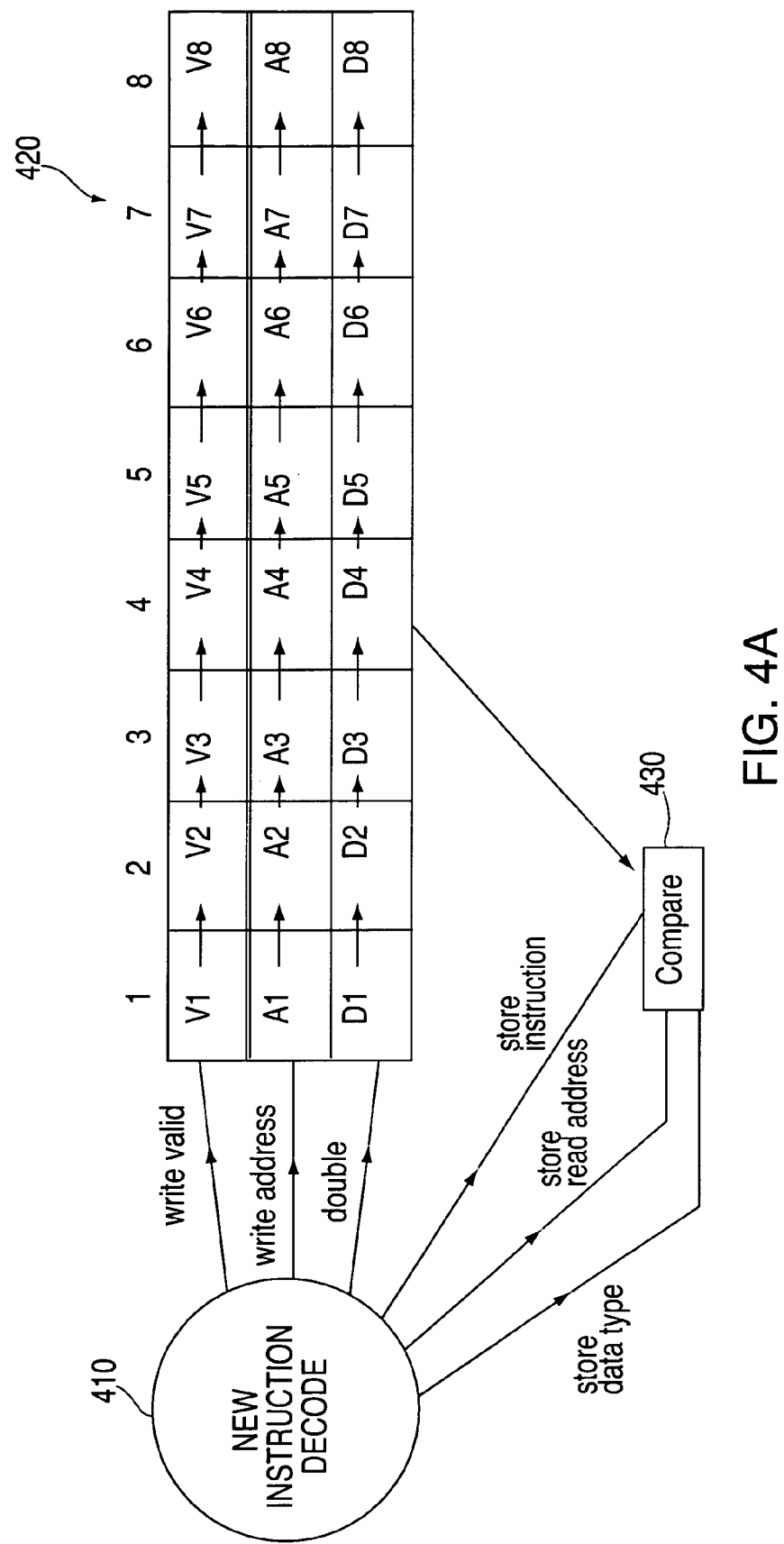
FIG. 4A depicts a complex dispatch unit and FIG. 4B a process flow diagram associated with the complex dispatch unit that may be implemented by alternate exemplary embodiments of the present invention.
Figure 4B:
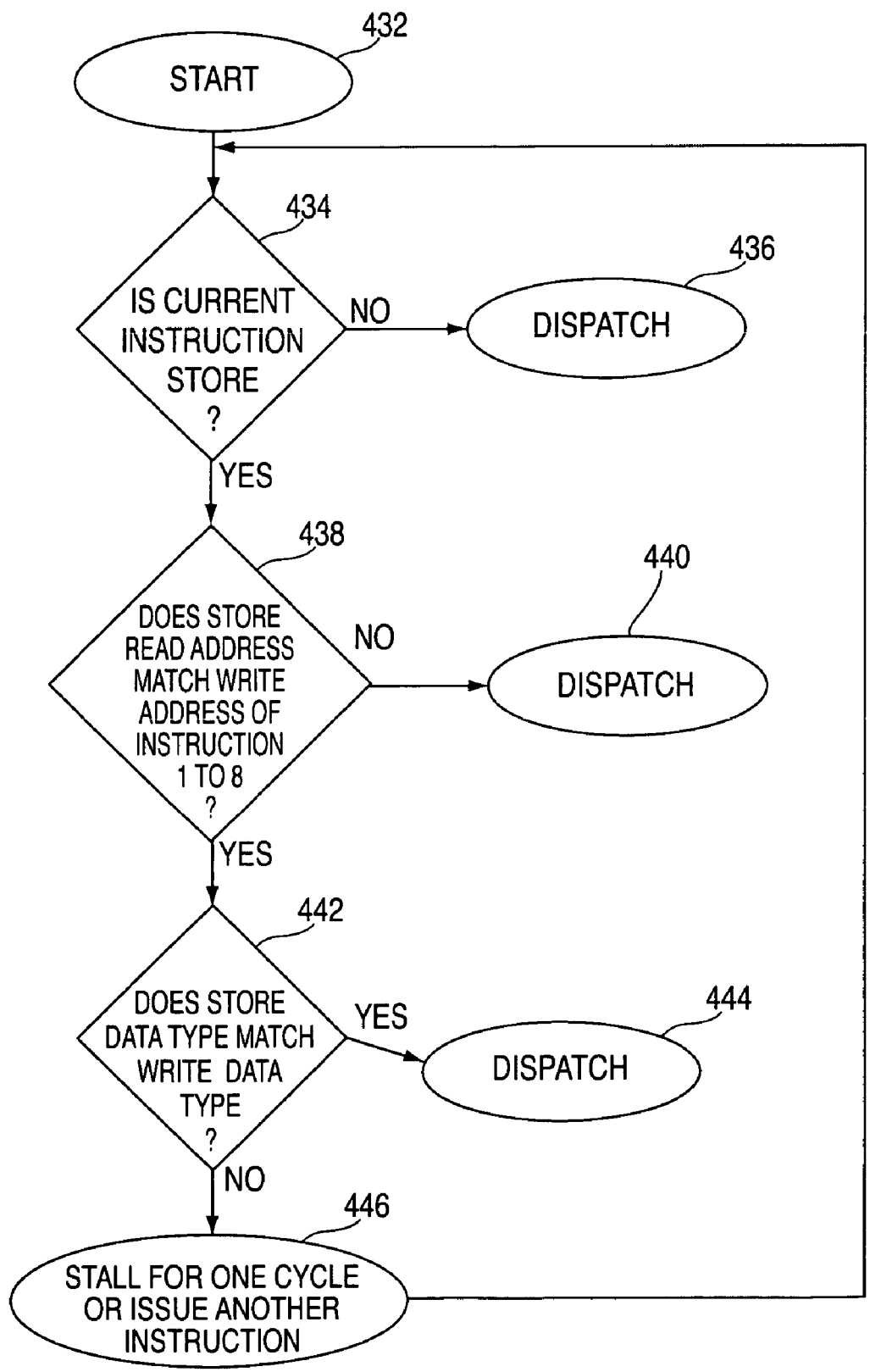

FIG. 4A depicts a complex dispatch unit and FIG. 4B a process flow diagram associated with the complex dispatch unit that may be implemented by alternate exemplary embodiments of the present invention. In an exemplary embodiment of the present invention, the dispatch unit and the instructions to implement the process flow are located in a controller associated with the FPU. Each new instruction in the pipeline enters the new instruction decode logic 410 to record a write valid switch, a write address and a data type switch in a write data array 420. When the new instruction is a store instruction, its store instruction, store read address and store data type are input to a comparator 430 to determine if the store instruction is interlocked with any instructions in the pipeline. The write data array 420 stores information about the last eight instructions. Each time a new instruction is issued, the information associated with the new instruction is stored and the existing values move down one bit in a manner similar to a push down stack, with the oldest value dropping out of the write data array 420.

The process flow depicted in FIG. 4B starts at step 432 and then determines if the current instruction is a store instruction at step 434. If the current instruction is not a store, then the instruction is dispatched at step 436. If the current instruction is a store instruction, as determined at step 434, then step 438 is executed to determine if the store read address matches the write address of any of the previous eight instructions. This is determined by the comparator 430 in FIG. 4A. If the store read address does not match the store read address of any of the previous eight instructions, as determined at step 438, then the store instruction is dispatched at step 440. Otherwise, a check is made at step 442 to determine if the store data type matches the write data type of the instruction with the matching address. If the data types match, then the store instruction is dispatched at step 444. Otherwise, the store instruction is stalled for one cycle or another instruction is issued at step 446. The processing then continues at step 432 to determine if the store instruction is still dependent on an instruction in the pipeline.

Exemplary embodiments of the present invention remove the stall cycles for data dependent store instructions that are introduced into the pipeline. The store instruction, if it is of the same data type as a previous instruction, is allowed to progress in the pipeline even though its data is dependent on the previous instruction whose execution has not yet completed. Exemplary embodiments of the present invention remove the possible performance disadvantages of pipelining store instructions by removing possible stall cycles due to data dependencies.

Exemplary embodiments of the present invention include a method of latency reduction when processing floating point stores in a floating point unit having a control unit, a data input register and a write stage register. An instruction is transferred from the floating point unit to a storage unit. The floating point unit has a plurality of pipeline stages for arithmetic computation, a normalization stage, and a rounding stage. Each of the pipeline stages may, during processing of a stream of instructions, contain a separate instruction. The stages are connected in an ordered manner such that the processing of instructions occurs in a pipeline, where when an active instruction of the instruction stream enters the pipeline all necessary input data operands are accessed and put into a first stage of the pipeline. The instruction advances from stage to stage within the pipeline as permitted by the instruction stream. An active instruction is a "stalled" instruction within a pipeline when forward progress is not permitted to advance to a new stage in the pipeline because a successive pipeline stage contains another previous instruction that itself cannot advance because the previous instruction has no data to operate. This is because an earlier instruction has not updated the data that the another previous instruction at the successive pipeline stage will operate upon. A next active instruction will "stall" at the entrance to the pipeline until the pipeline receives the updated data, characterized by, in the case of a data dependent floating point store instruction, the steps of: providing intermediate result data from a previous instruction; providing a forwarding path for the data dependent floating point store instruction to skip stages in the floating point pipeline; allowing the data dependent floating point store instruction to progress in the pipeline even though its data is dependent on a previous instruction whose execution has not yet completed. When a floating point store instruction enters the pipeline, a check is done to determine if the source operand register of the store is dependent upon the results of a previous instruction that has not yet completed and is in the pipeline and if there are no intervening instructions between the floating point store instruction and the instruction that it is dependent upon. A check is also done to verify that the store instruction and the previous instruction are of the same data type. The bypasses described herein are not performed if a data type mismatch is detected between the store instruction and the previous instruction. The control unit maintains information about the instructions that exist in each of the floating point pipeline stages and uses that information to form control signals to the dataflow floating point pipeline. The control unit provides control to various control points within the dataflow floating point pipeline for control of the progression of instructions through control stages of the floating point pipeline. Each control stage contains control information for a multiple instruction which may coexist within the floating point pipeline, and in the case of a store instruction with an immediate data dependency. An advancement of the control state in the progression of instructions through the stages allows a data dependent floating point store instruction to progress in the pipeline even though its data is dependent on a previous instruction whose execution has not yet completed by providing a late wrap path to resolve data dependent stores at the end of the pipeline. In addition, data is aligned with a data alignment circuit just before the pipeline output register. The late wrap path is controlled by an interlock resolution circuit in which interlock resolution detection occurs as the store instruction enters the pipeline. The interlock resolution circuit also provides for interlock detection for non-store instructions where the detection information is used to wrap results from a previous instruction in the last stage of the pipeline back through the data alignment circuit and back into the result register. The instruction data is held in staging registers that are held constant during a single execution cycle, and if an instruction cannot progress to the next pipeline stage, then a staging register for that pipeline stage is held constant for another execution cycle until at the end of an execution cycle the staging register either accepts a new instruction data or holds the previous value.

Other exemplary embodiments of the present invention include a method of latency reduction when processing floating point stores in a floating point unit having a control unit, a data input register and a write stage register from which an instruction is transferred from the floating point unit to a storage unit. The floating point unit has a plurality of pipeline stages for arithmetic computation, a normalization stage, and a rounding stage. Each of the pipeline stages may, during processing of a stream of instructions, contain a separate instruction. The stages are connected in an ordered manner such that the processing of instructions occurs in a pipeline. When an active instruction of the instruction stream enters the pipeline, all necessary input data operands are accessed and put into a first stage of the pipeline. The active instruction advances from stage to stage within the pipeline as permitted by the instruction stream. An active instruction is a "stalled" instruction within a pipeline when forward progress is not permitted to advance to a new stage in the pipeline because a successive pipeline stage contains another previous instruction that itself cannot advance because the previous instruction has no data to operate on because an earlier instruction has not updated the data that the another previous instruction at the successive pipeline stage will operate upon. A next active instruction will "stall" at the entrance to the pipeline until the pipeline receives the updated data. This is characterized by, in the case of a data dependent floating point store instruction, the steps of: providing intermediate result data from a previous instruction; providing a forwarding path for the data dependent floating point store instruction to skip stages in the floating point pipeline; and allowing the data dependent floating point store instruction to progress in the pipeline even though its data is dependent on a previous instruction whose execution has not yet completed. When a floating point store instruction enters the pipeline, a check is done to determine if the source operand register of the store is dependent upon the results of a previous instruction that has not yet completed and is in the pipeline and that there are no intervening instructions between the floating point store instruction and the instruction that it is dependent upon. A check is also done to verify that the store instruction and the previous instruction are of the same data type. The bypasses described herein are performed if a data type mismatch is detected between the store instruction and the previous instruction. In the case when the data dependent floating point store instruction is data dependent on an instruction in the pipeline but there exists one or more instructions between the store instruction and an interlocking instruction, as the store instruction enters the pipeline the contents of the source of the store is read out of a floating point register array and placed into the data input register even though the data is not the correct data in this case. When the control unit detects that there is an interlock with another instruction already in the pipeline of the delayed type, the control unit monitors the state of interlock every cycle and the store instruction is held in the data input register of the pipeline until the interlocking instruction reaches the write stage register of the pipeline where the result data is wrapped back into the data input register through an external feedback path. The store instruction proceeds through a multiplexer circuit to the pipeline write stage register of the pipeline and the store instruction is then fed through a data alignment circuit and into the write stage register of the pipeline once it becomes available. Once the data dependent store instruction is in the write stage register of the pipeline it is transferred out to the storage unit.

Further exemplary embodiments of the present invention include a floating point unit having a control unit, a data input register and a write stage register from which an instruction is transferred from the floating point unit to a storage unit. The floating point unit has a plurality of pipeline stages for arithmetic computation, a normalization stage, and a rounding stage, each of which pipeline stages may during processing of a stream of instructions contain a separate instruction. The stages are connected in an ordered manner such that the processing of instructions occurs in a pipeline. When an active instruction of the instruction stream enters the pipeline all necessary input data operands are accessed and put into a first stage of the pipeline. Then, the active instruction advances from stage to stage within the pipeline as permitted by the instruction stream. An active instruction is a "stalled" instruction within a pipeline when forward progress is not permitted to advance to a new stage in the pipeline because a successive pipeline stage contains another previous instruction that itself cannot advance because the previous instruction has no data to operate on because an earlier instruction has not updated the data that another previous instruction at the successive pipeline stage will operate upon. A next active instruction will "stall" at the entrance to the pipeline until the pipeline receives the updated data, characterized by, in the case of a data dependent floating point store instruction, the steps of: providing intermediate result data from a previous instruction; providing a forwarding path for the data dependent floating point store instruction to skip stages in the floating point pipeline; allowing the data dependent floating point store instruction to progress in the pipeline even though its data is dependent on a previous instruction whose execution has not yet completed. When a floating point store instruction enters the pipeline, a check is done to determine if the source operand register of the store is dependent upon the results of a previous instruction that has not yet completed and is in the pipeline and that there are no intervening instructions between the floating point store instruction and the instruction that it is dependent upon. A check is also done to verify that the store instruction and the previous instruction are of the same data type. The bypasses described herein are not performed if a data type mismatch is detected between the store instruction and the previous instruction. The data dependent store instruction is interlocked with another instruction in the pipeline and there are no instructions between the two. As the store instruction enters the pipeline, the contents of the source of the store is read out of a floating point register array and placed into the data input register even though it is not valid in this case. When the control unit detects that there is an interlock with another instruction already in the pipeline of the immediate type, the store is moved forward into a pipeline stage register of the pipeline as soon as the immediate interlocking instruction moves forward into the write stage register of the pipeline even though its data is not valid yet. When the interlocking instruction is in the write stage register and is ready to leave the pipeline, its data is selected through a multiplexer circuit and then is latched back into the write stage register of the pipeline again. After the store instruction is in the write stage register of the pipeline, it is transferred out to the storage unit.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention, can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for performing floating point arithmetic operations, the system comprising:
   a plurality of stages making up a pipeline, the stages including a first stage and a last stage;
   a register file adapted for receiving a store instruction for input to the pipeline, wherein the data associated with the store instruction is dependent on a previous operation still in the pipeline;
   a store register adapted for outputting the data associated with the store instruction to memory; and
   a control unit including instructions for:
   inputting the store instruction into the pipeline and providing a path for forwarding the data associated with the store instruction from the last stage in the pipeline to the store register for use by the store instruction if the previous operation immediately precedes the store operation in the pipeline and if there is a data type match between the store instruction and the previous operation; and
   inputting the store instruction into the pipeline and providing a path for forwarding the data associated with the store instruction from the first stage in the pipeline to the store register for use by the store instruction if the previous operation precedes the store operation by one or more stage in the pipeline and if there is a data type match between the store instruction and the previous operation.

2. The system of claim 1 wherein there is a data type match between the store instruction and the previous operation if the data associated with the store instruction has the same data type as the store instruction.

3. The system of claim 1 wherein there is a data type match between the store instruction and the previous operation if the store instruction has the same data type as instructions currently in the pipeline.

4. The system of claim 1 wherein the control unit further includes instructions for stalling the store instruction for one cycle if there is a data type mismatch between the store instruction and the previous operation.

5. The system of claim 1 wherein the control unit further includes instructions for stalling the store instruction for one cycle if there is a data type mismatch between the store instruction and any instruction located in the pipeline.

6. The system of claim 1 wherein the control unit further includes instructions for stalling the store instruction until the previous operation is out of the pipeline if there is a data type mismatch between the previous instruction and the store instruction.

7. The system of claim 1 wherein the control unit further includes instructions for stalling the store instruction for one cycle if a data at a read address associated with the store instruction does not match the store instruction data type.

8. The system of claim 1 wherein the pipeline includes seven stages.

9. A method for performing floating point arithmetic operations, the method comprising:

receiving a store instruction for input to a pipeline made up a plurality of stages including a first stage and a last stage, wherein data associated with the store instruction is dependent on a previous operation still in the pipeline;

inputting the store instruction into the pipeline and providing a path for forwarding the data associated with the store instruction from the last stage in the pipeline to a store register for use by the store instruction if the previous operation immediately precedes the store operation in the pipeline and if there is a data type match between the store instruction and the previous operation, wherein the store register is adapted for outputting the data associated with the store instruction to memory; and inputting the store instruction into the pipeline and providing a path for forwarding the data associated with the store instruction from the first stage in the pipeline to the store register for use by the store instruction if the previous operation precedes the store operation by one or more stage in the pipeline and if there is a data type match between the store instruction and the previous operation.

10. The method of claim 9 wherein there is a data type match between the store instruction and the previous operation if the data associated with the store instruction has the same data type as the store instruction.

11. The method of claim 9 wherein there is a data type match between the store instruction and the previous operation if the store instruction has the same data type as instructions currently in the pipeline.

12. The method of claim 9 further comprising stalling the store instruction for one cycle if there is a data type mismatch between the store instruction and the previous operation.

13. The method of claim 9 further comprising stalling the store instruction for one cycle if there is a data type mismatch between the store instruction and any instruction located in the pipeline.

14. The method of claim 9 further comprising stalling the store instruction until the previous operation is out of the pipeline if there is a data type mismatch between previous instruction and the output of the previous operation.

15. The method of claim 9 further comprising stalling the store instruction for one cycle if a data at a read address associated with the store instruction does not match the store instruction data type.

16. The method of claim 9 wherein the pipeline includes seven stages.

* * * * *